United States Patent
Heo et al.

(10) Patent No.: US 7,986,958 B2
(45) Date of Patent: Jul. 26, 2011

(54) METHOD FOR SETTING TRANSMISSION POWER OF DATA CHANNEL IN A FREQUENCY DIVISION MULTIPLE ACCESS SYSTEM AND MOBILE STATION APPARATUS FOR THE SAME

(75) Inventors: Youn-Hyoung Heo, Suwon-si (KR); Ju-Ho Lee, Suwon-si (KR); Seung-Hoon Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 913 days.

(21) Appl. No.: 11/877,261

(22) Filed: Oct. 23, 2007

(65) Prior Publication Data
US 2008/0102879 A1    May 1, 2008

(30) Foreign Application Priority Data

Oct. 23, 2006  (KR) .................. 10-2006-0102882
Jun. 25, 2007  (KR) .................. 10-2007-0061976

(51) Int. Cl.
*H04W 52/22*  (2009.01)
*H04W 52/26*  (2009.01)

(52) U.S. Cl. .................. 455/522; 455/69; 455/517

(58) Field of Classification Search .................. None
See application file for complete search history.

(56) References Cited

U.S. PATENT DOCUMENTS

| | | | |
|---|---|---|---|
| 5,669,066 A | 9/1997 | Borg et al. | 455/69 |
| 5,893,036 A | 4/1999 | Trandai et al. | 455/522 |
| 6,744,743 B2 * | 6/2004 | Walton et al. | 370/318 |
| 2001/0014589 A1 | 8/2001 | Tiedemann, Jr. et al. | 455/69 |
| 2004/0203419 A1 * | 10/2004 | Crocker et al. | 455/67.11 |
| 2005/0239413 A1 * | 10/2005 | Wiberg et al. | 455/522 X |

* cited by examiner

*Primary Examiner* — Philip J Sobutka
(74) *Attorney, Agent, or Firm* — The Farrell Law Firm, P.C.

(57) ABSTRACT

A method and apparatus for setting transmission power of a data channel by a mobile station in a Frequency Division Multiple Access (FDMA) system. The power setting method and apparatus includes receiving scheduling information from a base station; comparing a data rate of desired transmission data with a data rate of the scheduled data; if the data rate of desired transmission data is less than the data rate of the scheduled data, adjusting a currently set transmission power offset value according to the data rate of desired transmission data and the data rate of the scheduled data; and setting transmission power of the data to be transmitted to the base station using the adjusted transmission power offset value, and transmitting the data using the set transmission power value.

16 Claims, 5 Drawing Sheets

METHOD FOR SETTING TRANSMISSION POWER OF DATA CHANNEL IN A FREQUENCY DIVISION MULTIPLE ACCESS SYSTEM AND MOBILE STATION APPARATUS FOR THE SAME

PRIORITY

This application claims priority under 35 U.S.C. §119(a) to a Korean Patent Application filed in the Korean Intellectual Property Office on Oct. 23, 2006 and assigned Serial No. 2006-102882, and a Korean Patent Application filed in the Korean Intellectual Property Office on Jun. 25, 2007 and assigned Serial No. 2007-61976, the disclosures of both of which are incorporated herein by reference.

BACKGROUND OF THE INVENTION

1. Field of the Invention

The present invention relates generally to a Frequency Division Multiple Access (FDMA) system, and in particular, to a method and apparatus for setting transmission power of a data channel in an FDMA system.

2. Description of the Related Art

The uplink multiple access scheme used in mobile communication systems is roughly divided into a non-orthogonal multiple access scheme and an orthogonal multiple access scheme. The 'non-orthogonal multiple access scheme' refers to a multiple access scheme in which uplink signals transmitted from multiple mobile stations are not orthogonal with each other. The Code Division Multiple Access (CDMA) scheme is one example of the non-orthogonal multiple access scheme. The 'orthogonal multiple access scheme' refers to a multiple access scheme in which uplink signals transmitted from multiple mobile stations are orthogonal with each other. The Frequency Division Multiple Access (FDMA) scheme and the Time Division Multiple Access (TDMA) are examples of the orthogonal multiple access scheme.

In the general packet data communication system, a mixed scheme of the FDMA scheme and the TDMA scheme is used as an orthogonal multiple access scheme. Transmission signals of several users can be distinguished on the basis of frequency and time. In the present application, the 'FDMA scheme' refers to the mixed scheme of the FDMA scheme and the TDMA scheme.

Typical examples of the FDMA scheme include an Orthogonal Frequency Division Multiple Access (OFDMA) scheme and a Single Carrier Frequency Division Multiple Access (SC-FDMA) scheme. The FDMA schemes refer to a multiple access scheme for allowing multiple mobile stations to transmit signals over different subcarriers, making it possible to distinguish the signals of the mobile stations.

With reference to FIG. 1, a detailed description will now be made of a transmitter employing an Interleaved Frequency Division Multiple Access (IFDMA), also known as a Distributed FDMA (DFDMA) scheme, which is one of the SC-FDMA schemes.

FIG. 1 illustrates an exemplary structure of an IFDMA transmitter. Although the IFDMA transmitter is realized by utilizing a Fast Fourier Transform (FFT) and an Inverse Fast Fourier Transform (IFFT) in FIG. 1, the transmitter can be realized in another manner. The FFT/IFFT-based realization method shown in FIG. 1 can facilitate a change in IFDMA system parameters because of its low hardware complexity.

Referring to FIG. 1, in the IFDMA transmitter, an FFT 104 is disposed in front of an IFFT 106 used for multi-carrier transmission. In FIG. 1, therefore, transmission symbols 100 are input to the FFT 104 on a block-by-block basis. The signals output from the FFT 104 are input to the IFFT 106 at regular intervals, and IFDMA transmission signal components are transmitted over regular-interval subcarriers in the frequency domain. Generally, a size N of input/output signals of the IFFT 106 is greater than a size M of input/output signals of the FFT 104.

In the OFDM transmitter, as the transmission symbols 100 are directly input to the IFFT 106 without passing through the FFT 104 and then transmitted over several subcarriers, a high Peak-to-Average Power Ratio (PAPR) occurs. Even in the IFDMA transmitter, the transmission symbols 100 are finally processed in the IFFT 106 and then transmitted over multiple carriers. However, as the transmission symbols 100 are pre-processed by the FFT 104 before undergoing the final processing, the IFDMA transmitter can obtain an effect similar to the effect that the output signals of the IFFT 106 are transmitted over a single carrier, by means of the cancellation function between the FFT and the IFFT, thereby achieving a lower PAPR compared to the OFDM transmitter.

Finally, the IFDMA transmitter converts the outputs of the IFFT 106 into a serial stream in a Parallel-to-Serial Converter (PSC) 102, and adds a Cyclic Prefix (CP) thereto by means of a CP adder 108 before transmission like in the OFDM system, thereby preventing interference between multipath channel signal components.

FIG. 2 illustrates an exemplary structure of a Localized Frequency Division Multiple Access (LFDMA) transmitter, similar to the IFDMA transmitter, capable of ensuring the orthogonality between multiple access users and achieving a lower PAPR compared to the OFDM transmitter, based on single-carrier transmission.

As can be seen in FIG. 2, the difference between the LFDMA scheme and the IFDMA scheme in terms of the transmitter structure is in that outputs of an FFT 204 are applied to inputs of an IFFT 206, which have serial indexes. Therefore, in the frequency domain, LFDMA transmission signals occupy the band composed of adjacent subcarriers used when the outputs of the FFT 204 are mapped to the inputs of the IFFT 206. In other words, in the frequency domain, the IFDMA transmission signals occupy subcarrier bands (or subbands) scattered at regular intervals, and the LFDMA transmission signals occupy the subcarrier band composed of adjacent subcarriers.

In the general uplink mobile communication system, a base station can support a higher system capacity with the limited wireless resources by channel selective scheduling. The term 'uplink' as used herein refers to transmission from a mobile station to a base station, and the term 'channel selective scheduling' as used herein refers to a technology for allocating, to a mobile station, the time interval or frequency interval having the better channel environment for the channel that varies in the time axis or the frequency axis, to allow the mobile station to transmit data, thereby achieving system capacity improvement.

FIG. 3 illustrates exemplary scheduling on the time axis. Referring to FIG. 3, in step 303, a mobile station 302 transmits a pilot signal to undergo scheduling for data transmission. A base station 301, as it can detect a channel status of the mobile station 302 depending on the pilot signal transmitted from the mobile station 302, can determine whether to perform scheduling and select an appropriate demodulation scheme and code rate when the mobile station 302 determines to perform scheduling. In step 304, the mobile station 302 sends a status report. The term 'status' as used herein refers to a status of the buffer, data in which the mobile station desires to transmit, or a status of the power at which the mobile station desires to transmit data. The mobile station 302 can report the amount of packet data or a service priority of packet data, as the information indicating the buffer status, and can report the maximum transmission power as the information indicating the power status. In step 305, the base station 301 performs a scheduling procedure on the mobile station 302 based on the information acquired from the status report and the pilot signal. After the scheduling, the base station 301 transmits grant information to the corresponding mobile station 302 in step 306. Upon receipt of the grant information, the mobile station 302 transmits data in response thereto in step 307.

In the general scheduling scheme, the power information can be either transmitted or not transmitted to the base station by the mobile station according to the algorithm for setting transmission power. In other words, in the system using a closed-loop power control scheme, the base station cannot determine the maximum data rate allowable to the mobile station until the mobile station transmits power headroom information to the base station. However, in the system using an open-loop power control scheme, even though the mobile station transmits no power information, the base station can determine the maximum data rate allowable to the mobile station depending only on the Signal-to-Interference Ratio (SIR) of the pilot received from the mobile station.

Next, a description will be made of a method for setting power when the mobile station transmits data over a Shared Data Channel (SDCH). For data transmission power, the conventional Wideband Code Division Multiple Access (WCDMA) system uses different beta values according to desired transport formats. The term 'transport format' as used herein refers to a value that varies according to the size of the desired transmission data, or the service type of the desired transmission data. The beta value indicates the ration in which the system will transmit data in proportion to the transmission power of the pilot channel controlled by closed-loop power control. The beta value can be signaled, or can be set by a calculation.

WCDMA allows the mobile station to freely determine a transport format according to the amount or type of its desired transmission data and to efficiently set the uplink transmission power according to the transport format. However, in the current FDMA system, discussion is being conducted on a transmission power setting method which is different from the foregoing method, for the following reason. Because the FDMA system, unlike the WCDMA system, uses orthogonal frequency resources, there is no interference between mobile stations in the cell, and in the scheduling method now under discussion, the mobile station cannot select the amount and Modulation and Coding Scheme (MCS) level of frequency resources corresponding to the transport format, and simply transmits the data according to the information set by the base station. However, even in the OFDM system, because the interference to adjacent cells remains unchanged, the OFDM system can set transmission power considering only the interference level.

A detailed description will now be made of a method for setting transmission power of the data channel. A mobile station transmits a reference channel signal for closed-loop power control, and adjusts transmission power of the corresponding channel in response to a power control command received from a base station. Here, the transmission power of the reference channel is referred to as 'P_ref' and the transmission power of the data channel is referred to as 'P_data'. P_data can be set using Equation (I).

$$P\_data = P\_ref - 10 \log 10(Nc\_ref) + 10 \log 10(Nc\_data) + Offset\_data \quad (1)$$

In Equation (1), Nc_ref and Nc_data denote the number of frequency subcarriers used for the reference channel and the number of frequency subcarriers used for the data channel, respectively, and Offset_data denotes a power ratio per frequency tone of the reference channel to the data channel, and is referred to as a 'power offset value'. As described above, Offset_data is a value that the base station sets regardless of a data rate of the desired transmission data, or a value that the mobile station controls depending on such factors as the interference to neighbor cells.

A description will now be made of an operation performed when the mobile station desires to transmit data at a data rate less than the scheduled data rate. In the FDMA system, because the base station has correct information on the amount of data that the mobile station desires to transmit, depending on a buffer status/power status report, the mobile station basically transmits the data as scheduled by the base station. However, when the status report is delayed or the status report is not correctly made due to the limited amount of information, and when resources are allocated to be occupied for a predetermined time in a Voice over Internet Protocol (VoIP) scheduling process, the base station may not have correct information on the buffer status of the mobile station. When the mobile station needs a data rate greater than the data rate allocated by the base station, the mobile station can increase the data rate by sending a scheduling request. However, if the mobile station has no right to select the data rate, the mobile station has no way but to adjust the data rate to the data rate format in which the upper layer allocates the total amount of data by zero padding. This method is simple, but may cause unnecessarily interference. Even though the mobile station can use low transmission power according to the low data rate, the zero-padded data is transmitted at a high data rate, so the mobile station may use high transmission power, causing interference. Therefore, as a method for addressing this problem, discussion is being conducted on the method in which if the base station schedules particular frequency resource and MCS level, the mobile station selects a data rate from among several limited data rates based on the scheduling result, and transmits data at the selected data rate.

After the base station has allocated frequency resources for data transmission, when the mobile station simultaneously transmits data and control information as it has control information to transmit over an uplink, the mobile station may occasionally use some of the control information allocated for the data transmission, for transmission of the control information. In this case, the mobile station performs puncturing on some bits of the data, and due to the puncturing, the data is transmitted with a small number of physical layer bits, so it may have a code rate higher than the expected code rate, causing a decrease in the data transmission quality. For the case where the data and the control information are simply simultaneously transmitted, the mobile station can transmit the data and the control information with the power increased by a predetermined level. However, for the case where the amount of control information is variable, for example, for the case where the mobile station transmits Acknowledgement (ACK)/Negative Acknowledgement (NACK), when the mobile station transmits Channel Quality Indication (CQI) or transmits both ACK/NACK and CQI, the amount of resources that should undergo puncturing changes. Therefore, it is not preferable to increase the power as the determined power level.

No discussion has been made on the method for setting transmission power in transmitting data at the low data rate. However, because the Offset_data calculated by Equation (1) is not defined as a value determined depending on the data rate, if the mobile station uses the intact Offset_data calculated by Equation (1), it may not have the merit of transmitting data at the low data rate.

SUMMARY OF THE INVENTION

An aspect of the present invention is to address at least the problems and/or disadvantages and to provide at least the advantages described below. Accordingly, an aspect of the present invention is to provide a method for setting transmission power needed when a mobile station desires to transmit data at a data rate lower than the data rate scheduled by a base station in an FDMA-based wireless communication system.

Another aspect of the present invention is to provide a method for setting transmission power of a mobile station in a ratio of a scheduled data rate to a data rate selected by a mobile station in a FDMA-based wireless communication system.

Another aspect of the present invention is to provide a method for setting transmission power when a mobile station transmits uplink data, and a transmission apparatus thereof.

According to one aspect of the present invention, there is provided a method for setting transmission power of a data channel by a mobile station in a Frequency Division Multiple Access (FDMA) system. The power setting method includes receiving scheduling information from a base station; comparing a data rate of desired transmission data with a data rate of the scheduled data; if the data rate of the desired transmission data is less than the data rate of the scheduled data, adjusting a currently set transmission power offset value according to the data rate of the desired transmission data and the data rate of the scheduled data; and setting the transmission power of the data to be transmitted to the base station using the adjusted transmission power offset value, and transmitting the data using the set transmission power value.

According to another aspect of the present invention, there is provided a method for setting transmission power of a data channel by a mobile station in a Frequency Division Multiple Access (FDMA) system. The power setting method includes receiving scheduling information from a base station; comparing a data rate of data that the mobile station desires to transmit with a data rate of the scheduled data; if the data rate of the desired transmission data is less than the data rate of the scheduled data, adjusting a transmission power offset value used when the mobile station sends a previous status report to the base station, according to the data rate of the desired transmission data and the data rate of the scheduled data; and setting the transmission power of the data to be transmitted to the base station using a lesser of the adjusted transmission power offset value and the currently set transmission power offset value, and transmitting the data using the set transmission power value.

According to further another aspect of the present invention, there is provided a method for setting transmission power of a data channel by a mobile station in a Frequency Division Multiple Access (FDMA) system. The power setting method includes adjusting a currently set transmission power offset value according to a data rate of data that the mobile station presently desires to transmit and a data rate of data that the mobile station has previously transmitted; and setting transmission power of data to be transmitted to the base station using a lesser of the adjusted transmission power offset value and the currently set transmission power offset values, and transmitting the data using the set transmission power value.

According to yet another aspect of the present invention, there is provided a mobile station apparatus for setting transmission power of a data channel in a Frequency Division Multiple Access (FDMA) system. The mobile station apparatus includes a transmission data determiner for determining a data rate of desired transmission data using scheduling information received from a base station; a transmission power controller for adjusting a transmission power offset value necessary for data transmission using the data rate of desired transmission data, a data rate scheduled from the base station, and a currently set transmission power offset value or a transmission power offset value used when sending a previous status report to the base station, and setting the data rate of the data according to the adjusted transmission power offset value; and a data channel transmitter for transmitting the data to the base station according to the set transmission power.

According to still another aspect of the present invention, there is provided a mobile station apparatus for setting transmission power of a data channel in a Frequency Division Multiple Access (FDMA) system. The mobile station apparatus includes a transmission data determiner for determining a data rate of desired transmission data using scheduling information received from a base station; a transmission power controller for adjusting a transmission power offset value necessary for data transmission using the data rate of desired transmission data, a previous data rate used for previous data transmission, and a transmission power offset value used for the previous data transmission, and setting the data rate of the data according to the adjusted transmission power offset value; and a data channel transmitter for transmitting data to the base station according to the set transmission power.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE PREFERRED EMBODIMENTS

Figure 1:
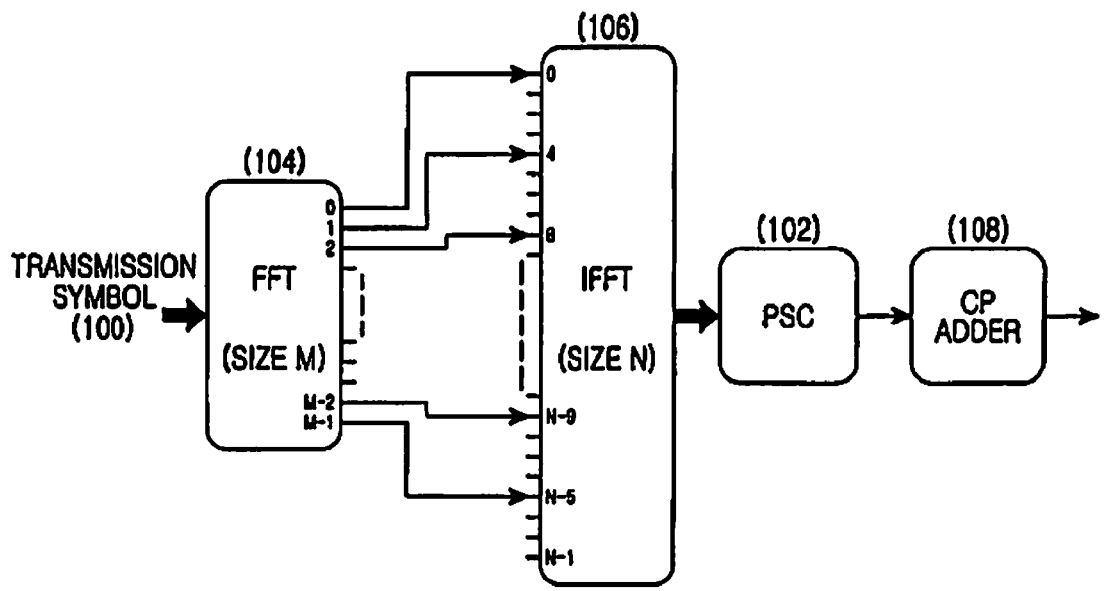
FIG. 1 illustrates the structure of an IFDMA transmitter.
Figure 2:
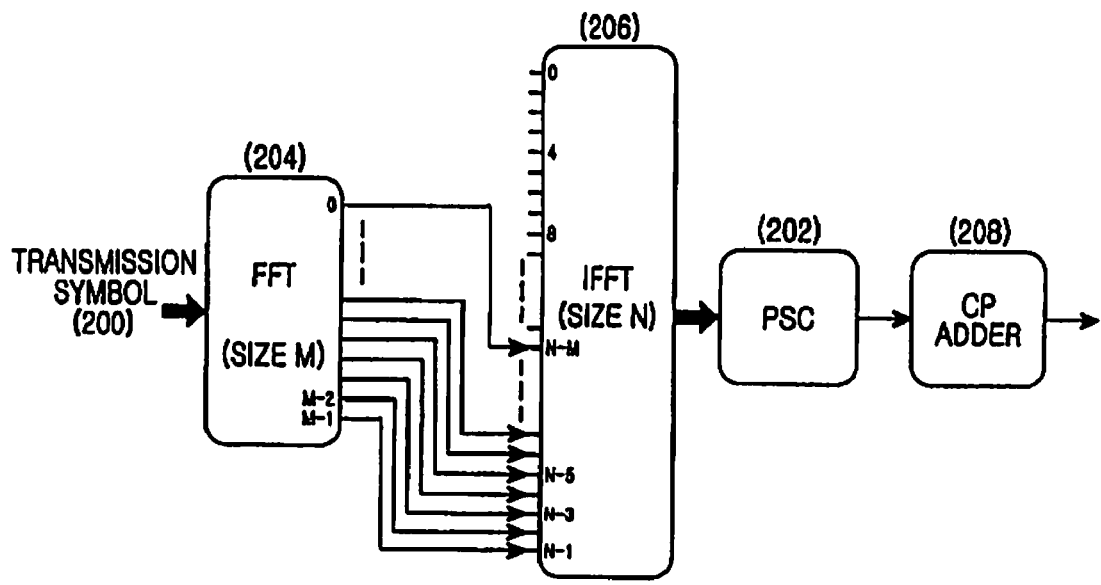
FIG. 2 illustrates the structure of an LFDMA transmitter.
Figure 3:
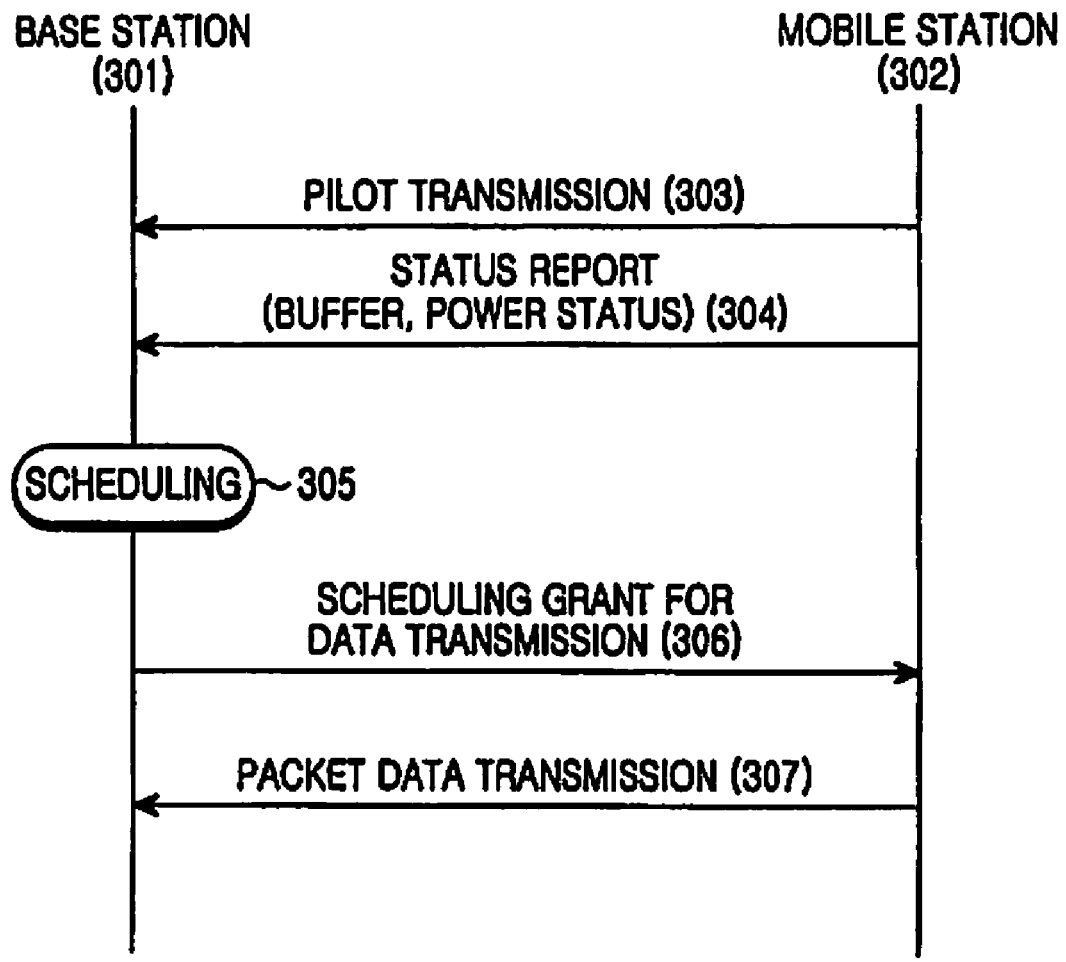
FIG. 3 illustrates scheduling on the time axis.

Preferred embodiments of the present invention will now be described in detail with reference to the annexed drawings. In the following description, a detailed description of known functions and configurations incorporated herein has been omitted for clarity and conciseness.

According to the present invention, in the FDAM-based uplink data transmission system where a transmission power level of the data is not defined as a particular value depending on a data rate during data transmission of a mobile station, the mobile station sets the transmission power when the mobile station needs to transmit data using a data rate less than the data rate designated by the base station. The data rate is a value determined based on the amount of frequency resources and the MCS level in use, and is the amount of information data that the mobile station can transmit, and the transport format or the number of physical layer bits.

The present invention is characterized in that the mobile station, in determining transmission power, sets a power level to set power in order to minimize interference with neighbor cells with use of desired data rate information, scheduled data rate information, and power level information controlled by the mobile station. The scheduled data rate information is the maximum data rate at which the mobile station can transmit data. In the prior art, the mobile station uses its desired data rate information and transmission power information corresponding thereto, or uses only the power offset information controlled by the mobile station. However, in the present invention, the mobile station uses both the desired data rate information and the scheduled data rate information.

A description will first be made of the reason why the mobile station uses the scheduled data rate information in setting the transmission power. In the uplink, the base station, when performing base station-based scheduling, determines a data rate necessary for the mobile station based on buffer status information and power status information of the mobile station. The mobile station, when it performs power control, reports, as the power status information, the allowable power level or the power offset information indicating a power ratio per frequency tone of the reference power channel to the data channel. Particularly, when the mobile station determines the data transmission power using the value such as an interference level to neighbor cells or a path loss of the scheduling cell regardless of the data rate, the base station should have power offset information, for efficient scheduling.

The base station, if it has power offset information, can determine an available reception data rate based on the power offset information. Even for the same power offset, the base station can determine a different data rate according to a Quality of Service (QoS) of the data that the mobile station will transmit. When the base station scheduling works normally, the relationship between the mobile station's power offset information and the scheduled data rate can be seen as a power level satisfying the transmission quality. Therefore, when the mobile station uses a data rate less than the scheduled data rate for data transmission, the mobile station can set an appropriate transmission power level by adjusting the power offset value with use of a ratio of the scheduled data rate to the desired actual data rate.

A detailed description will now be made of a transmission power setting method according to an embodiment of the present invention.

First Embodiment

A first embodiment of the present invention adjusts a power offset value set in a mobile station by a ratio of the data rate scheduled by a base station to the data rate desired by the mobile station. To this end, the first embodiment proposes Equation (2) for setting the power offset value of the mobile station.

$$\text{Offset\_data\_}k = \text{Offset\_data\_}ori * f(\text{DataRate\_scheduling}, \text{DataRate\_}k) \quad (2)$$

In Equation (2), Offset_data_k denotes a power offset value necessary for $k^{th}$ data transmission, and Offset_data_ori denotes a power offset value currently set in the mobile station. Further, DataRate_scheduling denotes a value corresponding to the data rate scheduled by the base station, and DataRate_k denotes a data rate that the mobile station desires to transmit data at a $k^{th}$ time. The DataRate_scheduling and the DataRate_k can mean a Transport Block Size (TBS).

According to Equation (2), the power offset value currently set in the mobile station is adjusted by a value determined based on a function f(DataRate_scheduling, DataRate_k) of the data rate desired by the mobile station and the scheduled data rate. For the function f(DataRate_scheduling, DataRate_k) of Equation (2), Equation (3) can be defined so that the power offset value can be adjusted by a ratio of the data rate scheduled by the base station to the data rate of the data that the mobile station desires to transmit.

$$\text{Offset\_data\_}k = \text{Offset\_data\_}ori * \frac{\text{DataRate\_}k}{\text{DataRate\_scheduling}} * \Delta_{\textit{diff}} \quad (3)$$

According to Equation (3), scheduling Offset_data_ori is adjusted by a ratio of the data rate scheduled by the base station to the data rate desired by the mobile station. In other words, when the scheduled data rate (the number of bits of information) is 1000 bits but the data rate of the actual transmission data is 500 bits, the mobile station uses the power offset value reduced by ½ times, i.e. by 3 dB. The $\Delta_{\textit{diff}}$ (Delta_diff) is a parameter used when there is a need for additional power offset adjustment. That is, because a code rate greatly changes when the mobile station desires to transmit data according to the two data rates, or because the necessary power level can slightly change when there is a change in the demodulation scheme, the $\Delta_{\textit{diff}}$ value is used to compensate for the changes.

Figure 4:
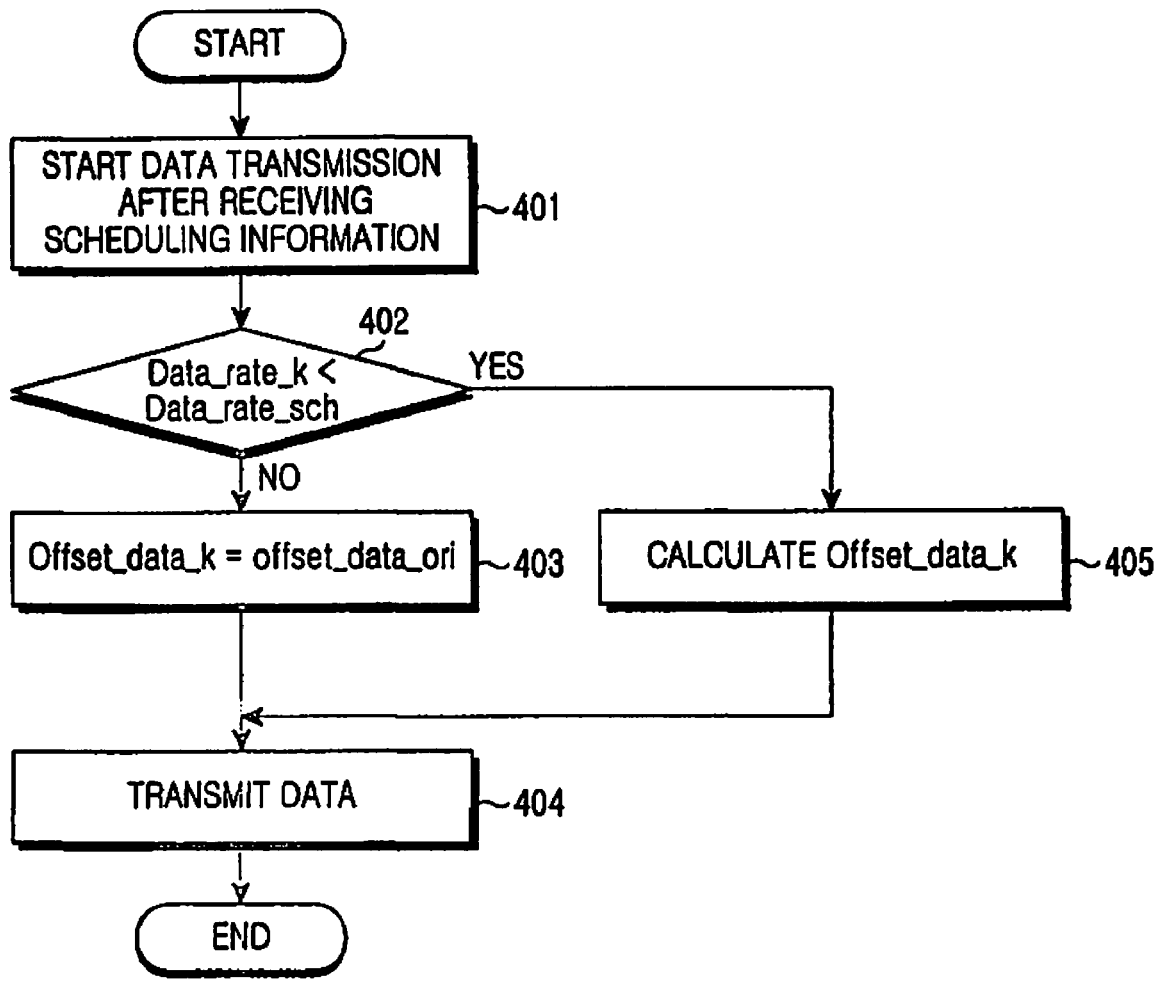
FIG. 4 illustrates an operating procedure of a mobile station for realizing a power setting method according to a first embodiment of the present invention.

With reference to FIG. 4, a description will now be made of an operating procedure of a mobile station for realizing the power setting method according to the first embodiment of the present invention.

FIG. 4 illustrates an operating procedure of a mobile station for setting a power level according to the first embodiment of the present invention.

Referring to FIG. 4, in step 401, a mobile station, if it has data to transmit, receives scheduling information from a base station, and then starts data transmission depending on the scheduling information. In step 402, the mobile station compares a data rate Data_rate_k of the data that it desires to transmit, with a data rate Data_rate_sch of the data scheduled from the base station. If Data_rate_k is not less than Data_rate_sch, the mobile station proceeds to step 403 where it sets Offset_data_ori, currently controlled in the mobile station, to Offset_data_k, and then proceeds to step 404 where the mobile station transmits data according to the data rate to which the offset value set in step 403 is applied. However, if Data_rate_k is less than Data_rate_sch, the mobile station proceeds to step 405 where it calculates Offset_data_k using Equation (2). Thereafter, in step 404, the mobile station transmits data according to the data rate to which the calculated Offset_data_k is applied.

Figure 5:
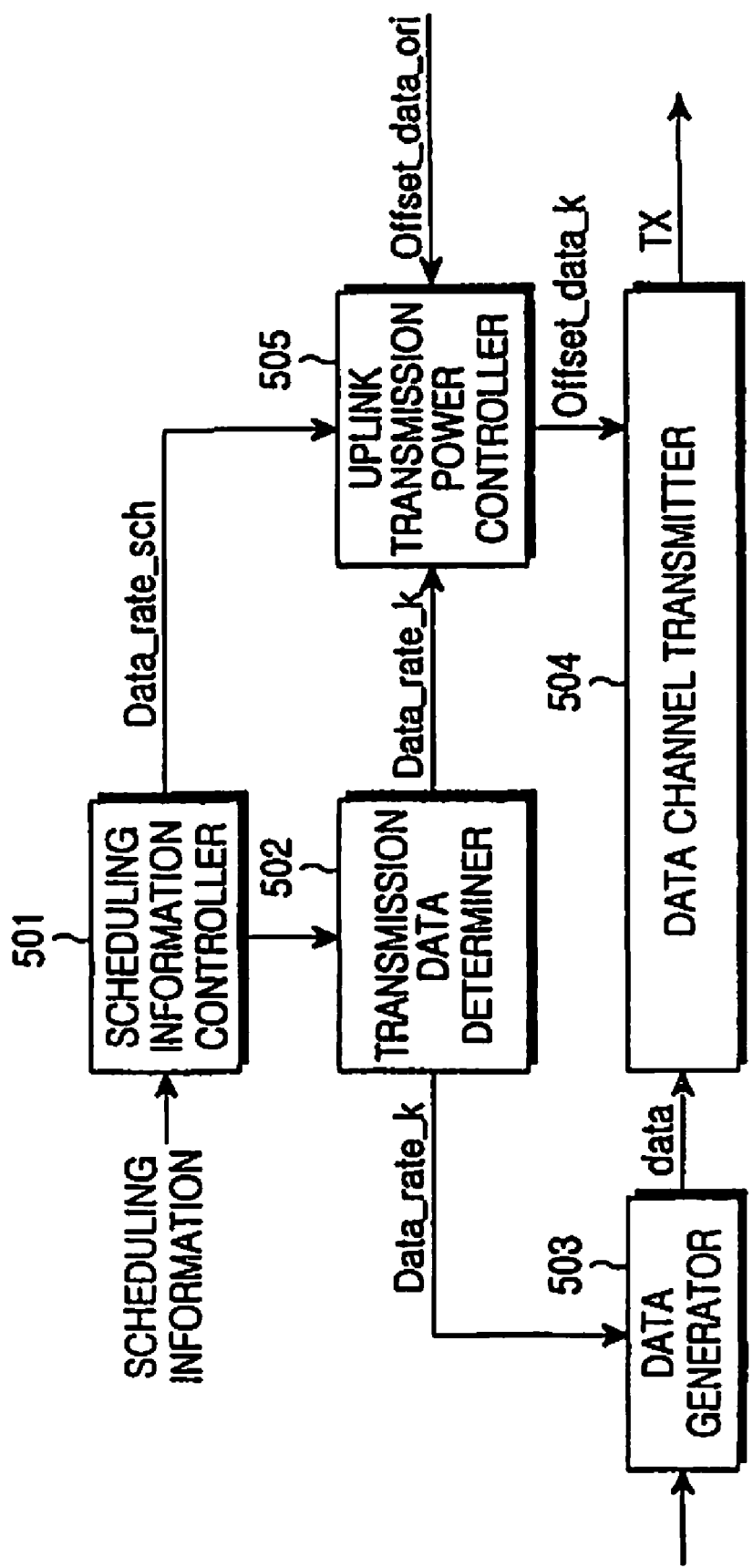
FIG. 5 illustrates a structure of a mobile station for realizing a power setting method according to the first embodiment of the present invention.

With reference to FIG. 5, a description will now be made of a structure of a mobile station for realizing the power setting method according to the first embodiment of the present invention.

Referring to FIG. 5, a scheduling information controller 501 receives scheduling information from a base station and forwards the scheduling information to a transmission data determiner 502. The transmission data determiner 502 determines Data_rate_k using the scheduling information provided from the scheduling information controller 501. An uplink transmission power controller 505 determines a power offset for the reference channel now undergoing power control. That is, the uplink transmission power controller 505 receives Data_rate_sch from the scheduling information controller 501, receives Data_rate_k from the transmission data determiner 502, calculates Offset_data_k using Equation (2), and transfers the Offset_data_k to a data channel transmitter 504. The data transmitter 504 transmits the data generated in a data generator 503 according to the Data_rate_k determined by the transmission data determiner 502 and the Offset_data_k calculated by the uplink transmission power controller 505.

Second Embodiment

A power setting method according to a second embodiment of the present invention is similar to the power setting method according to the first embodiment of the present invention. However, while the first embodiment of the present invention adjusts the power offset value currently set in the mobile station, the second embodiment of the present invention adjusts the power offset value that the mobile station has previously reported to the base station.

The reason for adjusting the power offset value reported to the base station is as follows. Because the power offset value satisfying the reception quality expected at the time the base station performs scheduling is the value reported from the mobile station, when the power offset undergoes a change by a need of the mobile station after the mobile station has reported the power offset value to the base station, if the mobile station transmits the data using the changed power offset, the power offset value cannot satisfy the reception quality desired by the base station. In other words, when the mobile station transmits the data using the data rate scheduled by the base station, the mobile station needs to use the currently set power offset value. However, when the mobile station transmits the data with a data rate less than the data rate scheduled by the base station, the transmission power should be set according to the power offset value reported from the mobile station, which is a more correct value.

To this end, the second embodiment of the present invention proposes Equation (4) for setting the power offset value.

$$\text{Offset\_data\_cal} = \text{Offset\_data\_rep} * f(\text{DataRate\_scheduling}, \text{DataRate\_k}) \quad (4)$$

$$\text{Offset\_data\_k} = \begin{cases} \text{Offset\_data\_ori} & \text{if Offset\_data\_cal} > \text{Offset\_data\_ori} \\ \text{Offset\_data\_cal} & \text{else} \end{cases}$$

In Equation (4), Offset_data_rep denotes a power offset value at the time that the mobile station sends a power status to the base station. Further, Offset_data_cal denotes a value obtained by adjusting Offset_data_rep according to a relationship between the data rate scheduled by the base station and the data rate at which the mobile station currently desires to transmit data.

The power offset value can be adjusted by a ratio of the data rate scheduled by the base station to the data rate desired by the mobile station as to the simplest function like Equation (3) according to the first embodiment of the present invention. After calculating the power offset value suitable for the data rate of the desired actual transmission data, the mobile station compares Offset_data_cal with Offset_data_ori indicating the power offset value currently set in the mobile station. As a result of the comparison, if Offset_data_cal is greater than Offset_data_ori, the mobile station sets Offset_data_k to Offset_data_ori. Otherwise, the mobile station sets Offset_data_k to Offset_data_cal.

The reason for comparing Offset_data_cal with Offset_data_ori in this manner is as follows. In some cases, after the Offset_data_rep at the report time is adjusted, it can be greater than the Offset_data_ori currently kept by the mobile station. Because the Offset_data_ori is a value which is set considering such influences as the interference with the neighbor cells, performance of the neighbor cells can be affected if a value greater than this value is used as Offset_data_cal. Therefore, Offset_data_cal, which is the adjusted value of Offset_data_rep, is limited such that it should not exceed Offset_data_ori.

Figure 6:
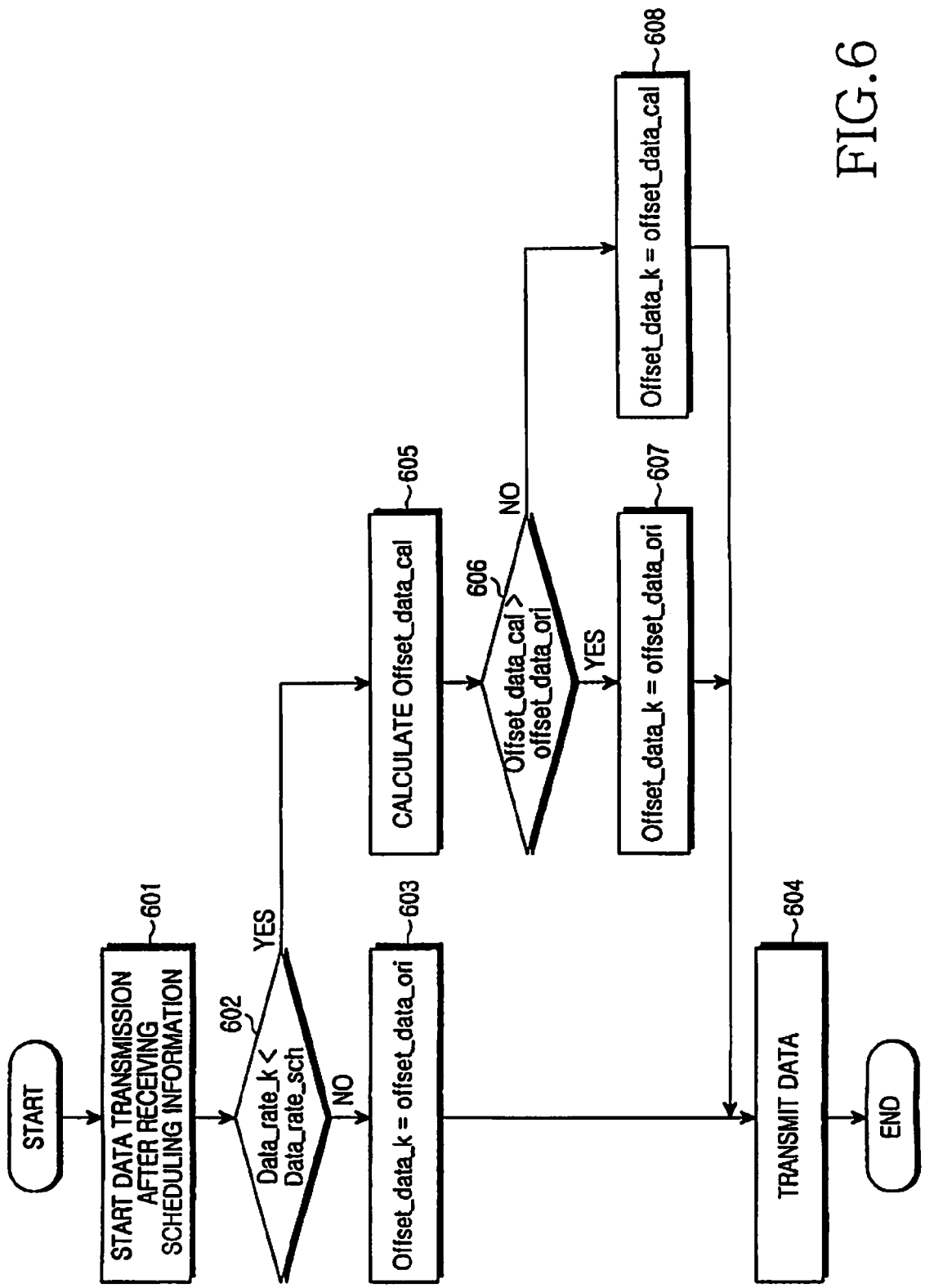
FIG. 6 illustrates an operating procedure of a mobile station for realizing a power setting method according to a second embodiment of the present invention.

With reference to FIG. 6, a description will now be made of an operating procedure of a mobile station for realizing the power setting method according to the second embodiment of the present invention.

Referring to FIG. 6, in step 601, a mobile station receives scheduling information from a base station and then starts data transmission depending on the scheduling information. In step 602, the mobile station compares a data rate Data_rate_k of the data that the mobile station currently desires to transmit, with a data rate Data_rate_sch scheduled from the base station. As a result of the comparison, if Data_rate_k is not less than Data_rate_sch, the mobile station proceeds to step 603 where it sets Offset_data_k to Offset_data_ori indicating the power offset value set in the mobile station. Thereafter, in step 604, the mobile station transmits the data according to the data rate to which the set power offset value is applied. However, if Data_rate_k is less than Data_rate_sch, the mobile station proceeds to step 605 where it calculates Offset_data_cal using Equation (4). Thereafter, in step 606, the mobile station compares the calculated Offset_data_cal with the Offset_data_ori. If it is determined that Offset_data_cal is greater than Offset_data_ori, the mobile station proceeds to step 607 where the mobile station sets Offset_data_k to Offset_data_ori. Thereafter, in step 604, the mobile station transmits the data with the data rate to which the set power offset value is applied. However, if Offset_data_cal is less than or equal to Offset_data_ori, the mobile station proceeds to step 608 where the mobile station sets Offset_data_k to Offset_data_cal. Thereafter, in step 604, the mobile station transmits the data according to the data rate to which the set power offset value is applied.

A mobile station apparatus for power setting according to the second embodiment of the present invention is equal to the mobile station apparatus according to the first embodiment of the present invention, except that the Offset_data_rep information is additionally needed as an input to the uplink transmission power controller 505.

Third Embodiment

A power setting method according to a third embodiment of the present invention determines a power offset value set in a mobile station using a ratio of the data rate of the previously transmitted data to the data rate of the desired current transmission data. When control information is transmitted together with data during the initial transmission of the data, the base station can adjust a power offset value of the data, expecting the transmission of the control information. However, during a retransmission of the data, the base station cannot consider the transmission of the control information. Therefore, during retransmission of the data, when the control information is transmitted together with the data, the third embodiment increases the power level. When the control information was transmitted during initial transmission of the data but there is no control information during retransmission of the data, the third embodiment decreases the power level. This is because when there is no control information during the retransmission of the data, the amount of available wireless resources increases compared to that in the initial transmission. Herein, the 'previous transmission' can mean transmission at the time before the transmission time determined for the same data, or mean the previous transmission in the same Hybrid Automatic Repeat reQuest (HARQ) process.

The third embodiment of the present invention proposes Equation (5) for setting a power offset value.

$$\text{Offset\_data\_k} = \text{Offset\_data\_k} - 1 * \frac{\text{DataRate\_}(k-1)}{\text{DataRate\_k}} * \Delta_{\text{diff}} \quad (5)$$

In Equation (5), Offset_data_k denotes a power offset value necessary during $k^{th}$ transmission for the same data, and Offset_data_k-1 denotes a power offset value that the mobile station has used during previous transmission (($k-1)^{th}$ transmission) for the same data. Further, DataRate_(k-1) denotes a data rate during previous transmission, and DataRate_k denotes a data rate that the mobile station desires to use at the $k^{th}$ time. In the third embodiment of the present invention, DataRate_k and DataRate_(k-1) can mean a size (length) of physical layer bits.

According to Equation (5), Offset_data_k is calculated by adjusting Offset_data_k_-1 of the present transmission by a ratio of the data rate of the previous transmission to the desired data rate of the current transmission. In other words, when the number of physical layer bits during previous transmission is 1000 bits but the number of physical layer bits of the current transmission data is 500 bits, the mobile station uses the power offset value increased by 2 times, i.e. by 3 dB, from that of the previous transmission. The $\Delta_{diff}$ is a parameter used when there is a need for additional power level adjustment. That is, because a code rate greatly changes compared to the previous transmission when the mobile station desires to transmit data according to the data rate for the previous transmission and the data rate for the desired current transmission, or because the necessary power level can slightly change when there is a change in the demodulation scheme, this parameter is used to compensate for the change in the power level, and this parameter is set to '1' if not needed.

The mobile station's operation and apparatus for power setting according to the third embodiment of the present invention is equal to the mobile station's operation and apparatus according to the first embodiment of the present invention, except that the DataRate_(k-1) information is used instead of the DataRate_scheduling information and the Offset_data_k-1 information is used instead of the Offset_data_ori information.

As is apparent from the foregoing description, according to the present invention, when the mobile station transmits the data using the data rate less than the scheduled data rate, the mobile station can transmit the data using lower transmission power while maintaining the transmission quality, thereby contributing to a reduction in the interference to the neighbor cells.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for setting transmission power of a data channel by a mobile station in a Frequency Division Multiple Access (FDMA) system, the method comprising:
   receiving scheduling information from a base station;
   comparing a data rate of desired transmission data with a data rate of scheduled data;
   if the data rate of the desired transmission data is less than the data rate of the scheduled data, adjusting a currently set transmission power offset value according to the data rate of desired transmission data and the data rate of the scheduled data; and
   setting the transmission power of the data to be transmitted to the base station using the adjusted transmission power offset value, and transmitting the data using the set transmission power value.

2. The method of claim 1, wherein the adjusting of the transmission power offset value comprises:
   decreasing the transmission power offset value by a ratio of the data rate of the desired transmission data to the data rate of the scheduled data.

3. The method of claim 1, further comprising:
   if the data rate of the desired transmission data is greater than or equal to the data rate of the scheduled data, setting the transmission power of the data using the currently set transmission power offset value, and transmitting the data to the base station using the set transmission power value.

4. A method for setting transmission power of a data channel by a mobile station in a Frequency Division Multiple Access (FDMA) system, the method comprising:
   receiving scheduling information from a base station;
   comparing a data rate of data that the mobile station desires to transmit with a data rate of scheduled data;
   if the data rate of the desired transmission data is less than the data rate of the scheduled data, adjusting a transmission power offset value used when the mobile station sends a previous status report to the base station, according to the data rate of the desired transmission data and the data rate of the scheduled data; and
   setting transmission power of data to be transmitted to the base station using a lesser of the adjusted transmission power offset value and the currently set transmission power offset value, and transmitting the data using the set transmission power value.

5. The method of claim 4, further comprising:
   if the adjusted transmission power offset value is greater than or equal to the currently set transmission power offset value, setting transmission power of the data to be transmitted to the base station using the currently set transmission power offset value, and transmitting the data using the set transmission power value.

6. The method of claim 4, wherein the adjusting of a transmission power offset value comprises:
   decreasing the transmission power offset value used for the status report by a ratio of the data rate of the desired transmission data to the data rate of the scheduled data.

7. A method for setting transmission power of a data channel by a mobile station in a Frequency Division Multiple Access (FDMA) system, the method comprising:
   adjusting a currently set transmission power offset value according to a data rate of data that the mobile station presently desires to transmit and a data rate of data that the mobile station has previously transmitted; and
   setting transmission power of data to be transmitted to the base station using a lesser of the adjusted transmission power offset value and the currently set transmission power offset values, and transmitting the data using the set transmission power value.

8. The method of claim 7, wherein the adjusting of a transmission power offset value comprises:

setting, as the transmission power offset value, a value obtained by increasing the transmission power offset value of the previously transmitted data by a ratio of the data rate of the previously transmitted data to the data rate of the desired transmission data.

9. A mobile station apparatus for setting transmission power of a data channel in a Frequency Division Multiple Access (FDMA) system, the apparatus comprising:

a transmission data determiner for determining a data rate of desired transmission data using scheduling information received from a base station;

a transmission power controller for adjusting a transmission power offset value necessary for data transmission using the data rate of desired transmission data, a data rate scheduled from the base station, and a currently set transmission power offset value or a transmission power offset value used when sending a previous status report to the base station, and setting the data rate of the data according to the adjusted transmission power offset value; and a data channel transmitter for transmitting the data to the base station according to the set transmission power.

10. The apparatus of claim 9, wherein the transmission power controller compares the data rate of desired transmission data with the data rate of the scheduled data; and if the data rate of desired transmission data is less than the data rate of the scheduled data, sets, as a transmission power offset value necessary for the data transmission, a value obtained by decreasing the currently set transmission power offset value by a ratio of the data rate of the desired transmission data to the data rate of the scheduled data.

11. The apparatus of claim 10, wherein the transmission power controller compares the data rate of desired transmission data with the data rate of the scheduled data; and if the data rate of the desired transmission data is greater than or equal to the data rate of the scheduled data, sets the currently set transmission power offset value as a transmission power offset value necessary for the data transmission.

12. The apparatus of claim 9, wherein the transmission power controller compares the data rate of desired transmission data with the data rate of the scheduled data; and if the data rate of desired transmission data is less than the data rate of the scheduled data, adjusts a transmission power offset value used when the mobile station sends a status report to the base station, according to the data rate of desired transmission data and the data rate of the scheduled data; and sets a transmission power offset value necessary for the data transmission using a lesser of the adjusted power offset value and the currently set power offset value.

13. The apparatus of claim 12, wherein the transmission power controller sets, as a transmission power offset value necessary for the data transmission, a value obtained by decreasing the power offset value transmitted during the status report by a ratio of the data rate of the desired transmission data to the data rate of the scheduled data.

14. The apparatus of claim 12, wherein the transmission power controller sets the currently set power offset value as a transmission power offset value necessary for the data transmission, if the data rate of the desired transmission data is greater than or equal to the data rate of the scheduled data.

15. A mobile station apparatus for setting transmission power of a data channel in a Frequency Division Multiple Access (FDMA) system, the apparatus comprising:

a transmission data determiner for determining a data rate of desired transmission data using scheduling information received from a base station;

a transmission power controller for adjusting a transmission power offset value necessary for data transmission using the data rate of desired transmission data, a previous data rate used for previous data transmission, and a transmission power offset value used for the previous data transmission, and setting the data rate of the data according to the adjusted transmission power offset value; and a data channel transmitter for transmitting data to the base station according to the set transmission power.

16. The mobile station apparatus of claim 15, wherein the transmission power controller sets, as the transmission power offset value necessary for the data transmission, a value obtained by increasing the transmission power offset value used for the previous data transmission by a ratio of the data rate used for the previous data transmission to the data rate of the desired transmission data.

* * * * *